Patented Feb. 20, 1940

2,190,890

UNITED STATES PATENT OFFICE 2,190,890

PROCESS FOR INFLUENCING THE GROWTH OF PLANTS

Josef Sellei, Budapest, Hungary, assignor to Big Mc's Photosensin Mfg. Inc., Yuma, Ariz., a corporation of Arizona No Drawing. Application January 3, 1938, Serial No. 183,124. In Hungary January 15, 1937

10 Claims. (Cl. 47—58)

My invention relates to a process for the treatment of plants and/or of the soil in which the plants are grown. The expression "plants" is intended to cover according to the invention not only the plants proper, but also seeds, germs and layers.

One of the objects of the invention is to obtain a growth-promoting effect, there being obtained either an increase of the size of the flowers, fruits or bulbs, or an increase of the quantity of crop, or both. Moreover, the fruit will also mature within a time shorter than normal.

A further object of the invention is to stunt the growth of plants, for instance when the production of dwarf plants is intended.

In the course of my earlier investigations I have ascertained that in the development of plants various dyestuffs may exert particular effects by advancing or stunting the growth of plants. For this purpose I have at first employed various kinds of aniline dyes, as Löffler's methylene blue, alizarine blue, water blue and subsequently fluorescent dyestuffs deriving from the group of phthaleins which exerted a substantial influence on the germination and on the vegetative development of the plants. It is well known that the substances called fluorescent are those which if brought into solution are under the action of impingent light glowing as long as the external source of light is exercising its action. Not only was the growth greater, but the plants treated according to my process also blossomed earlier than the control-plants. In some cases I was able to observe a growth-stunting effect.

I have now found that it is important to employ dyestuffs jointly with other substances, particularly with certain metal salts, and in suitable concentration, the selection of the concentration being essential for the advancing of growth (increase of size) as well as for the stunting of growth (diminution of size) of the plants.

I suppose that the cause of the phenomenon observed by me consists in the photo-dynamic effect of the dyestuffs employed, such dyes exerting a sensitizing effect on the plants. Also in this respect my process is entirely new, as up to now the main purpose of all agricultural endeavours only consisted in the better utilisation of the soil, which aim was endeavoured to achieve by means of manuring substances, fertilizers, and various other chemical substances. I was, however, the first, who attempted to improve the effect of the sunrays by the employment of chemical means. The special effect of the fluorescent dyestuffs consists in their photo-dynamic effect and already in my earlier experiments carried out with such dyestuffs without the addition of metal salts I have been able to prove that by means of fluorescent dyes, the effect of the sunrays used for the growth of the plants can also be utilized more intensely.

Now, I have, moreover, found that the effect achieved by means of the fluorescent dyestuffs is obtained in a higher degree when in addition to the dyestuffs the preparation or composition employed also contains small quantities of certain metal salts, particularly iron and/or copper salts, and preferably also quite small quantities of alkalies, particularly of sodium carbonate or sodium bicarbonate or of potassium carbonate or potassium bicarbonate.

The fluorescent dyestuffs coming under consideration are in the first place those deriving from the group of phthaleins, particularly resorcine phthaleine (fluoresceine), further fluorescine, eosine etc.

I have found that among iron and copper salts, sulphates give the best results. Instead of employing iron or copper salts, I may also employ the salts of other metals, like platinum, gold, silver, mercury etc., also catalyzers in the form of suspensions or emulsions, i. e. not in the form of salts, or, in short, all kinds of anorganic ferments.

Without limiting myself to any definite theoretical explanation, I suppose, according to the present stage of my investigations, that the metal salts, particularly copper and iron salts are acting as catalyzers, the iron increasing catalytically the power of assimilation of the plant and at the same time also balancing to a certain extent those differences which present themselves at different concentrations or dilutions of the preparation or composition employed. The copper salts are acting in the same way; used simultaneously with iron salts the copper is intensifying the effects of the iron and vice versa.

The preparations or compositions according to the invention are either employed in solutions, mainly in aqueous solutions, or they may be employed mixed with finely distributed solid substances, preferably with peat or humus, in order, for instance in the case of an employment on large areas, to enable the distribution to be effected more easily and more uniformly than would be feasible in the case of the employment of liquid solvents, particularly of water.

Another new observation consists in the fact that the concentration in which the dyestuff or the preparation is employed is also of substantial importance for the growth-influencing effect of the preparation or composition containing fluorescent dyestuffs. I have found that the best results are obtained if each litre of the solution employed for the treatment of the plants contains less than 70 grams of a fluorescent dyestuff and less than 80 grams of an iron salt and/or less than 40 grams of a copper salt. These figures relate to liquid solvents, particularly to water.

The lower limit of the required quantities of the constituent parts of the preparation is according to the experiments carried out by me up to now the following: In 100 litres of solvent (e. g. water) 0.048 gramme of fluorescent dyestuff, 0.008 gramme of iron salt, 0.0006 gramme of copper salt. To the mixture there should be added a certain quantity of alkali, viz. of carbonate or bicarbonate as will be sufficient for dissolving the dyestuff employed. In the case of solid carrying substances, particularly peat, the same quantities of the dyestuff and of the additional substances should be employed, whilst the quantity of the solid carrying substance may be of any desired magnitude as long as it is sufficient for the uniform distribution of the acting substance. Within the maximum quantities stated of the various constituent parts, the composition of the preparation may vary between wide limits.

The most favourable concentration has to be ascertained for each plant by means of experiments. If these experiments, as will be described below, are carried out according to a pre-determined plan, standard figures are obtained for each kind of plant, at which in the case of the plant in question the reliable control of the development (in the sense of advancing or of stunting) is rendered possible.

In order to ascertain the optimal concentration and the optimal quantity of the preparation to be employed in each given case, series of tests have been carried out with different concentrations and quantities. In what follows the progress and the results of such tests are stated.

*1. Test with Coleus (in pots)*

Each pot contained 300 grammes of soil.
Water was employed as solvent.
The following solutions were prepared:
Each 100 litres of water contained the following quantities of chemicals:

| Fluoresceine | Iron sulphate | Copper sulphate | Mark |
|---|---|---|---|
| Grammes | Grammes | Grammes | |
| 0.286 | 0.0457 | 0.00343 | a |
| 0.251 | 0.0402 | 0.00300 | b |
| 0.203 | 0.0320 | 0.00240 | c |
| 0.167 | 0.0267 | 0.00200 | d |
| 0.143 | 0.0246 | 0.00185 | e |

A quantity of soda sufficient to effect the solution of the fluoresceine has been added. The quantity of bicarbonate should, however, not amount to more than 10 grammes in 100 litres of solvent.

In each of the various series of tests each pot was treated with the following quantities of one of the solutions defined above.

To the soil in each pot there was added 25 cc. of the solution on February 5 and again on February 22. Each pot received a 30 cc. dose of the solution on March 20, a 50 cc. dose on April 8 and a final 60 cc. application on April 19.

The most favourable result presented itself on March 20th in the case of the pot treated with the solution c. This is accordingly the optimal concentration and quantity. Whilst the plants which for the purposes of control have simultaneously been watered in the usual way, i. e. without any preparation containing a dyestuff, had a height of 6 cm. and a width of 11 cm., the plants treated according to the invention showed a height of 10 cm. and a width of 17 cm.

*2. Test with "network melons" (green ananas melons)*

Solutions marked a to g were prepared, each containing fluoresceine, iron sulphate and copper sulphate in the following proportions per 100 litres of water:

| Fluoresceine | Iron sulphate | Copper sulphate | Mark |
|---|---|---|---|
| Grammes | Grammes | Grammes | |
| 0.411 | 0.0642 | 0.0048 | a |
| 0.333 | 0.0533 | 0.0040 | b |
| 0.286 | 0.0457 | 0.00343 | c |
| 0.251 | 0.0402 | 0.00300 | d |
| 0.220 | 0.0355 | 0.00267 | e |
| 0.203 | 0.0320 | 0.00240 | f |
| 0.182 | 0.0291 | 0.00219 | g |

A quantity of alkali sufficient to effect the solution of the dyestuff has been added.

The plants were watered on June 8th, June 12th, June 19th, June 26th, July 3rd, July 17th and July 23rd, with increasing quantities of preparation, viz. with 150 cc., 250 cc., 400 cc., 500 cc., and 1 litre per plant.

The control plants have on the average brought a crop of 3260 grams. The increases of crop when using the solutions of the preparation containing fluoresceine were the following:

In the case of solution a there was an increase of crop of 25%
In the case of solution b there was an increase of crop of 80%
In the case of solution c there was an increase of crop of 60%
In the case of solution d there was an increase of crop of 75%
In the case of solution e there was an increase of crop of 85%

The optimal concentration is accordingly the one marked "e".

*3. Test with yellow beans (wax beans) in planting ridges*

Solutions marked a to f were prepared, each containing fluoresceine, iron sulphate and copper sulphate in the following proportions per 100 litres of water:

| Fluoresceine | Iron sulphate | Copper sulphate | Mark |
|---|---|---|---|
| Grammes | Grammes | Grammes | |
| 0.333 | 0.0533 | 0.0040 | a |
| 0.286 | 0.0457 | 0.00343 | b |
| 0.251 | 0.0402 | 0.00300 | c |
| 0.220 | 0.0355 | 0.00267 | d |
| 0.203 | 0.0320 | 0.00240 | e |
| 0.167 | 0.0267 | 0.00200 | f |

A quantity of alkali sufficient to effect the solution of the dyestuff has been added.

*Series of tests*

July 6th: Sowing and first treatment with the above concentrations with 100 grammes per 1 m. length of ridge.

July 24th: 2nd treatment with 500 grammes per 1 m. length of ridge.

Aug. 15th: 3rd treatment with 700 grammes per 1 m. length of ridge.

Aug. 30th: 4th treatment with 700 grammes per 1 m. length of ridge.

Sept. 14th: 5th treatment with 1 litre per shrub.

The best development and the greatest quantity of fruit (an excess of more than 100% as compared to the control plants) was obtained in the case of the solution e.

4. Test with cantaloup melons (peat test)

This test was carried out with peat as carrying substance.

500 grammes of peat were well mixed with:
0.0286 gramme of fluoresceine
0.0122 gramme of iron sulphate
0.0048 gramme of copper sulphate.

Of this mixture of peat, fluoresceine and iron and copper salts 10 grammes were used well mixed with soil for each young melon plant. The test was repeated twice. After 2½ months it was possible to ascertain the following result: the crop obtained was greater by 100% than in the case of the non-treated control plants.

5. Stunting test (in pots)

This test was carried out with following composition:

3.27 grammes of fluoresceine
0.12 gramme of copper sulphate
2.75 grammes of iron sulphate and a quantity of alkali sufficient to effect the solution of the dyestuff.

The series of tests described have been carried out on Hungarian soil. As the effect of the preparation depends in a certain degree on the soil and on the climate, deviations as to the optimal concentration may result in other soils. By means of systematic tests it is however always possible to obtain the optimum.

In a similar manner it is possible to ascertain the optimum in the case of other plants and with other compositions of the preparation.

What I claim is:

1. A process for influencing the growth of plants of all kinds which comprises applying a solution containing at least one fluorescent dyestuff and at least one iron salt in an amount which will catalyze the action of said dyestuff to the medium surrounding the root system of the plants.

2. A process for influencing the growth of plants of all kinds, which comprises applying a solution containing at least one fluorescent dyestuff and at least one copper salt in an amount which will catalyze the action of said dyestuff to the soil adjoining the plants.

3. A process for influencing the growth of plants of all kinds which comprises applying a solution containing at least one fluorescent dyestuff together with iron and copper salts in an amount which will catalyze the action of said dyestuff to the soil adjoining the plants.

4. A process for influencing the growth of plants of all kinds which comprises applying a solution containing a suitable fluorescent dyestuff, at least one metal salt, selected from the group consisting of iron salts and copper salts, in an amount which will catalyze the action of said dyestuff and a small quantity of an alkaline solubilizing agent, to the soil adjoining the plant.

5. A process for influencing the growth of plants of all kinds, in which the plants are watered with a solution each litre of which contains less than 70 grams of a fluorescent dyestuff and less than 80 grams of iron salt.

6. A process for influencing the growth of plants of all kinds in which the plants are watered with a solution each litre of which contains less than 70 grams of fluorescent dyestuff and less than 40 grams of copper salt.

7. A process for influencing the growth of plants of all kinds in which the plants are watered with a solution each litre of which contains less than 70 grams of fluorescent dyestuff, less than 80 grams of iron salt and less than 40 grams of copper salt.

8. A process of influencing the growth of plants which comprises applying a combination of fluorescent dyestuff and a metal salt, selected from the group consisting of copper salts and iron salts, in an amount which will catalyze the action of said dyestuff to the medium surrounding the root system of the plants.

9. A process of influencing the growth of plants which comprises introducing a solution containing not less than 0.048 gram of fluorescent dyestuff and not less than 0.006 gram of a copper salt per 100 litres of solvent, into the medium surrounding the root system of the plants said copper salt being employed in an amount which will catalyze the action of said dyestuff.

10. A process of influencing the growth of plants which comprises adding to the soil adjacent the root system of plants a mixture of a dry carrying substance containing a fluorescent dyestuff and a water-soluble metal salt selected from the group consisting of iron salts and copper salts in an amount which will catalyze the action of said dyestuff.

JOSEF SELLEI.